United States Patent [19]

Nelson

[11] Patent Number: 5,200,127
[45] Date of Patent: Apr. 6, 1993

[54] METHOD AND APPARATUS FOR GAS ASSISTED INJECTION MOLDING

[75] Inventor: William A. Nelson, New Baltimore, Mich.

[73] Assignee: Automotive Plastic Technologies, Inc., Sterling Heights, Mich.

[21] Appl. No.: 628,746

[22] Filed: Dec. 17, 1990

[51] Int. Cl.$^5$ .................. B29C 45/00; B29D 22/00
[52] U.S. Cl. .................. 264/85; 264/328.8; 264/328.12; 264/328.13; 264/572; 425/812
[58] Field of Search .................. 264/85, 328.8, 328.12, 264/328.13, 500, 572; 425/812

[56] References Cited

U.S. PATENT DOCUMENTS

| Re. 30,335 | 7/1980 | Johansson | 425/548 |
|---|---|---|---|
| 4,101,617 | 7/1978 | Friederich | 264/572 |
| 4,129,635 | 12/1978 | Yasuike et al. | 264/45.5 |
| 4,685,881 | 8/1987 | Sasaki | 425/562 |
| 4,781,554 | 11/1988 | Hendry | 425/4 R |
| 4,824,732 | 4/1989 | Hendry et al. | 428/542.8 |
| 4,855,094 | 8/1989 | Hendry | 264/40.3 |
| 4,905,901 | 3/1990 | Johnson | 239/135 |
| 4,935,191 | 6/1990 | Baxi | 264/572 |
| 4,942,006 | 7/1990 | Loren | 264/50 |
| 4,943,407 | 7/1990 | Hendry | 264/572 |
| 4,990,083 | 2/1991 | Bernhardt | 425/547 |
| 5,047,183 | 9/1991 | Eckardt et al. | 264/40.3 |

Primary Examiner—Leo B. Tentoni
Attorney, Agent, or Firm—Dykema Gossett

[57] ABSTRACT

A method and associated apparatus for gas assisted injection molding wherein a quantity of fluid molding material is injected through a first injection flow path in a gas assisted injection molding nozzle into a mold cavity. The injection is then stopped by interrupting the flow of fluid through the first mold cavity, and introducing a time delay if desired. After any time delay, a quantity of pressurized gas or fluid at a first desired pressure is injected into the mold cavity through a second injection flow path which is isolated from the first injection flow path. The pressure is then reduced to a desired holding pressure, and the pressure is held in the mold while the part cools enough to be self supporting, at which time the pressure is vented from the mold cavity, and the part removed. The apparatus used, by isolating the molding material from the gas passages, is able to be of a simpler construction, avoid clogging of the passages, and use larger gas passages, all without the use of any check valves.

46 Claims, 5 Drawing Sheets

```
┌─────────────────────────────────────────┐
│ INJECTING A QUANTITY OF FLUID MOLDING   │
│ MATERIAL THROUGH A FIRST INJECTION FLOW │
│ PATH WITHIN A GAS ASSISTED INJECTION    │
│ MOLDING NOZZLE INTO A MOLD CAVITY AT A  │
│ DESIRED INJECTION PRESSURE.             │
└─────────────────────────────────────────┘
                    │
┌─────────────────────────────────────────┐
│ HALTING, STOPPING, OR OTHERWISE         │
│ INTERRUPTING THE FLOW OF FLUID MOLDING  │
│ MATERIAL THROUGH SAID FIRST FLOW PATH   │
│ INTO THE MOLD CAVITY.                   │
└─────────────────────────────────────────┘
                    │
┌─────────────────────────────────────────┐
│ INTRODUCING A TIME DELAY, IF DESIRED.   │
└─────────────────────────────────────────┘
                    │
┌─────────────────────────────────────────┐
│ INJECTING A QUANTITY OF A PRESSURIZED   │
│ GAS OR FLUID AT A FIRST DESIRED         │
│ PRESSURE INTO THE MOLD CAVITY THROUGH A │
│ SECOND FLOW PATH IN A SAID GAS ASSISTED │
│ INJECTION MOLDING NOZZLE TO FORM A      │
│ FLUID OR GAS CONTAINING CAVITY WITHIN   │
│ THE MOLDED ARTICLE, SAID SECOND         │
│ INJECTION FLOW PATH NOT PERMITTING      │
│ FURTHER FLOW OF SAID PLASTIC MOLDING    │
│ MATERIAL.                               │
└─────────────────────────────────────────┘
                    │
┌─────────────────────────────────────────┐
│ CHANGING SAID FIRST DESIRED PRESSURE TO │
│ A DESIRED HOLDING PRESSURE AND          │
│ MAINTAINING THE FLUID OR GAS WITHIN THE │
│ MOLDED ARTICLE AT THE HOLDING PRESSURE  │
│ UNTIL IT HAS SUFFICIENTLY COOLED TO BE  │
│ SELF SUPPORTING.                        │
└─────────────────────────────────────────┘
                    │
┌─────────────────────────────────────────┐
│ RELEASING OR VENTING SAID FLUID OR GAS  │
│ PRESSURE BACK THROUGH SAID SECOND FLOW  │
│ PATH.                                   │
└─────────────────────────────────────────┘
```

*Fig-1*

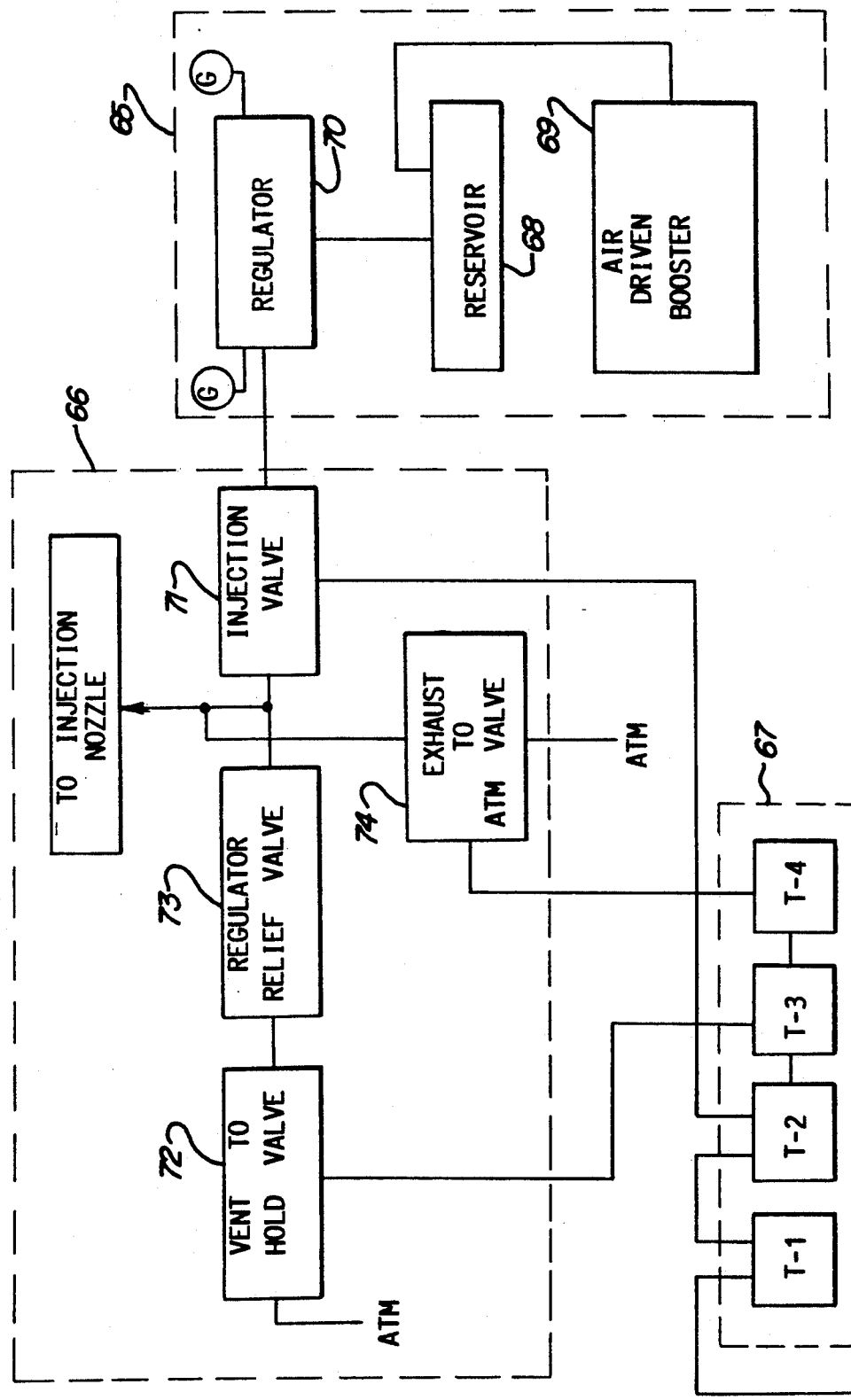

METHOD AND APPARATUS FOR GAS ASSISTED INJECTION MOLDING

BACKGROUND OF THE INVENTION

1. Field of the Invention

The present invention relates to injection molding methods and apparatus. More particularly the invention relates to improved methods and apparatus for gas assisted injection molding which is used where it is desired to make hollow plastic parts for the purposes of saving weight and material as well as providing improved surface finishes.

2. Description of the Prior Art

In the infancy of fluid injection molding, articles were generally produced by injecting a molten plastic material into a mold cavity and letting the material cool to form a molded article, at which time the mold cavity was opened and the article was released.

However, as the art of plastic molding advanced to allow the manufacture of larger and more complicated parts, it became evident that in parts having thick rib sections, or complicated cross-sections, the surface finishes of the surfaces opposite such portions of the molded part would suffer from sink marks and the like. In addition, as the size of the molded parts which were able to be produced increased, the cost of the material and the weight of the parts increased substantially.

This led those skilled in the art to develop methods of making these large and complicated parts of a hollow construction by injecting a fluid or gas into the interior of the part while it was being formed in the mold cavity. It was discovered that as the gas or fluid was injected into the interior of the mold cavity it would follow the path of least resistance. Since it is well known that the molten plastic will generally cool and harden from the outside inwardly, the gas would penetrate the inner, softer and warmer portions of the part, which would normally be found in the thicker sections where there is a structural rib, etc. By following this path, there was created a hollow within the plastic, and it could be expanded by the addition of pressure outwardly to fill the mold cavity. It was found that if the gas pressure was held at an effectively constant level while the plastic part cooled, the surface finish of the plastic part would be greatly enhanced, i.e., by the elimination of sink marks, etc.

However, along with the idea of the injection of the gas or fluid, came the need to vent the gas to relieve the pressure within the part before the mold could be opened. Many solutions were tried to discover a satisfactory way of introducing the gas into the interior of the plastic part, and then to vent the gas before opening the mold cavity.

Several types of apparatus have been produced. In one type, only plastic molding material is introduced into the mold cavity through the injection nozzle, which is in contact with the mold sprue. In this apparatus, called "pin in runner", the venting of the gas takes place through the runner in the mold cavity. However, this normally leaves one or more holes in the hollow injected molded part when the "runner" is removed, which may be covered by a plug. Alternatively, complicated apparatus may be used for sealing the hole in the cavity wall through which the gas enters the cavity by injecting a further quantity of plastic material. However such attempts have generally not met with commercial acceptance, particularly for parts which require surface finish.

In a second type of apparatus, called "pin in article", it is known to inject both plastic and fluid or gas through the injection nozzle and the mold sprue, and then to mechanically vent the molded part by piercing or boring a vent opening in the wall of the molded article. However, in many cases, the act of piercing itself does not guaranty that gas will escape unless a hollow piercing tool is used. In some cases, even the use of a hollow tool has not successful because the molten plastic blocks the hollow tool during the step of introducing the plastic material into a mold space.

In another similar type construction, the mold cavity is shaped such that an easily removable portion of the wall of the molded material is formed by the provision of "break" lines, and this plug is pulled out of the mold to vent the part. However this method also results in a hole in the part which has to be plugged, which is unacceptable for many types of molded articles.

In another type of construction, it is known to introduce the gas through the injection nozzle which introduces the plastic material, and then to vent the cavity by a step involving creating a gap between the nozzle and the mold. This allows the gas to pass from the cavity to atmosphere. This step is known as "sprue break". However this method also has a number of disadvantages. Under present day circumstances, it is considered undesirable to vent the gas into the environment of the molding machine for health reasons. Further, some molding machines are not equipped to permit a "sprue break", and the apparatus needed to contain the gas which is vented is complicated and expensive. Thus this method also unsatisfactory for some applications, and an improved method which eliminates uncontrolled venting is needed.

For these reasons, many in the art have gone to a still further known arrangement wherein there is provided, in association with the supply of pressurized gas, a single injection nozzle having a first passage for injection of a thermo-plastic, and a second passage for the introduction of a pressurized gas. During the supply of pressurized gas through the nozzle to the mold cavity, a check valve is initially used to keep the thermo-plastic out of the second passage. The pressurized gas is then introduced into the mold cavity, after the flow of thermo-plastic starts. The flow of thermo-plastic is then completed, but the flow of the pressurized gas continues until a certain volume is introduced. The mold is then held under pressure until the molded part is sufficiently cooled, at which time, after venting, the mold can be opened. U.S. Pat. Nos. 4,781,554 and 4,855,094 of James W. Hendry are examples of this type of operation.

However, these and other apparatus, which have heretofore operated on the principle that a flow of molten material must first be started, and then a flow of pressurized fluid or gas is started, have suffered from the problem of clogging of the gas supply passages due to the molten material entering and clogging the gas supply passages during the initial injection of molten plastic. This involves costly down time and complicated apparatus to try and prevent the entry of the molten molding material into the gas supply system. It was not until the discovery that it is possible to sequentially first introduce a molding material into the mold cavity, and then shut off the supply of plastic, and thereafter introduce the pressurized gas through the injection nozzle into the interior of the mold cavity, that a satisfactory solution to the problems in the prior art was found.

SUMMARY OF THE INVENTION

In accordance with the present invention there is provided a method and apparatus for gas assisted injection molding for producing an injection molded article by introducing a stream of molding material from an injection molding machine cylinder through an injection nozzle into an article forming mold space. After the desired amount of material has been injected to fill the mold cavity, the flow through the injection nozzle is stopped, and replaced by a pressurized fluid or gas flow at a first desired pressure, depending on the application. The volume of the gas or fluid supply will, effectively, be much greater than the volume of the mold cavity, eliminating the effects of cooling on the gas or fluid pressure. Thereafter, the pressure of the fluid or gas is reduced to a "holding" pressure, also depending on the application, and the molded article is allowed to at least partially cool while the pressure in the mold cavity is held at the "holding" pressure. When the plastic article has cooled sufficiently to be self-supporting, the gas within it is vented to atmosphere through the same passages by which it entered the mold cavity. The mold can then be opened and the molded article ejected.

In one embodiment of the invention, a quantity of molten plastic is injected through a first injection flow path in a gas assisted injection molding nozzle into a mold cavity. The injection of the molten plastic through the first flow path is completely stopped, and a charge of pressurized fluid is injected into the mold cavity through a second flow path. The second injection flow path is isolated from the first injection flow path to prevent any possibility of the pressurized fluid traveling back through the first flow path to the supply of molten plastic. The fluid pressure within the article produced is then reduced and maintained until the article is set in the mold cavity. The pressurized fluid is then vented to ambient through the same flow path in which it entered.

In another modification of the present invention, a quantity of molten plastic is injected through a flow path including an injection nozzle in full communication with a mold sprue into the interior of a mold cavity. The injection of the molten plastic is then interrupted, and a charge of pressurized fluid at a first desired pressure is made into the flow path and through the injection nozzle into the interior of the molten plastic. The fluid pressure is reduced to a second "holding" pressure and contained within the article produced until it has cooled sufficiently in the mold to be self-supporting, and then the pressure within the mold is vented back through the injection nozzle.

In another modification of the invention, a process of forming a molded article is shown whereby a quantity of liquid molding material is injected through an injection flow path into a mold cavity. The injection of the material is stopped and replaced by a flow of pressurized fluid to form a fluid-containing cavity in the material. The fluid pressure is contained within the article until it is set in the mold cavity, and the fluid pressure is vented through the flow path.

In yet another modification of the invention, an injection molding apparatus having means for injecting a quantity of molten plastic through an injection flow path and an injection nozzle is disclosed, which has means for interrupting the flow path to stop the flow of molten plastic, means for injecting a charge of pressurized fluid into the flow path near the point of interruption and there through to the mold cavity, means to hold the fluid pressure within the article produced until it has set, and means for venting the pressurized fluid back through the injection nozzle.

In another embodiment of the invention an injection molding nozzle having an elongated body portion has a first bore including a converging throat portion, a cylindrical bore portion in fluid communication with said converging throat portion, a barrel receiving portion in fluid communication with said bore portion, a material diverter portion in fluid communication with said barrel receiving portion, a nozzle adapter receiving portion in fluid communication with said material diverter portion, and a second bore portion. A rotatable barrel is mounted in said barrel receiving portion and alternately forms a first injection flow path or a second injection flow path when it is rotated between its first and second positions.

Thus, one of the objects of the present invention is to provide a method of gas assisted injection molding which provides for initial injection of molten plastic or resin material into a mold cavity, through a first injection flow path. This is followed by the halting of the resin injecting process, and replacement thereof with a injection of a pressurized fluid or gas through a second flow path at a first desired pressure. The reduction of the first desired pressure is followed by a reduction to a second, or "holding" pressure, if needed by the application. The pressure is then maintained within the molded article until it is cooled sufficiently to be self-supporting, and then the venting of the pressurized fluid or gas within the part, back out through the same passage which it entered, is done.

A further object of the present invention is to provide an improved gas assisted injection molding apparatus for carrying out the foregoing method in which a first flow path is created for the injection of molten molding material into a mold. This flow path is then interrupted and replaced with a second flow path for the injection of a pressurized fluid or gas, followed by the cooling of the article and the venting of the gas through the same second flow path by which it entered.

A further object of the present invention is to provide for a time delay, if desired, between the time the flow of molding material into the mold cavity stops, and the injection of pressurized fluid or gas starts.

A still further object of the present invention is to provide an improved gas assisted injection molding apparatus wherein a "sprue break" is not necessary for venting the gas within the molded article before opening the mold cavity.

A still further object of the present invention is to provide an improved injection molding nozzle for use in apparatus of the foregoing kind.

Another object of the present invention is to provide an improved "shut-off" nozzle for use in injection molding equipment.

A still further object of the present invention is to provide a process for resin molding of injection articles using the foregoing method and apparatus, and an article produced thereby.

Further objects and advantages of this invention will be apparent from the following description and appended claims, reference being had to the accompanying drawings forming a part of this specification, wherein like reference characters designate corresponding parts in the several views.

BRIEF DESCRIPTION OF THE DRAWINGS

FIG. 1 is a flow chart showing the steps followed by the process or method of the present invention.

FIG. 9 is a diagrammatic view of some of the features shown in FIG. 8.

Figure 2:
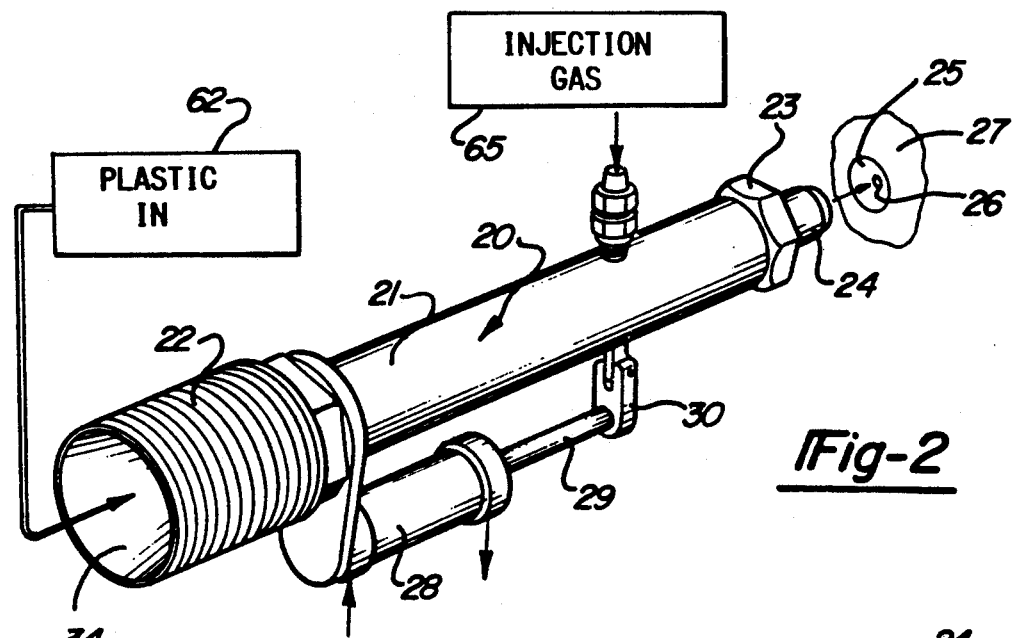
FIG. 2 is a prospective view of a gas assisted injection molding nozzle embodying the construction of the present invention.

It is to be understood that the present invention is not limited in its application to the details of construction and arrangement of parts illustrated in the accompanying drawings since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Referring now to FIG. 1, in its broadest sense, the method of the present invention involves the six steps shown therein. Although generally intended for molding hollow objects of synthetic resins, it is well within the scope of the present invention to use other molding materials in the process of the present invention, and thus the first step of my method or process would be to inject a quantity of a fluid molding material through a first injection flow path into a mold cavity at a desired injection pressure. In the preferred embodiment of the invention, the fluid molding material would be of molten plastic or synthetic resin, although other materials could be used. The first injection flow path would generally be a continuous flow path from the output of an injection molding machine to the mold sprue of a mold cavity. Generally, immediately before the mold sprue, there would be an injection nozzle terminating the first injection flow path. In contrast to the prior art methods, there is no injection whatever of a pressurized fluid or gas during this step in the process.

The next step in the method or process is to completely halt the flow of the fluid molding material through the first injection flow path. This may be done in any practical manner, such as by the provision of a valve means in the first fluid flow path, or the displacement of a portion of the first injection flow path and its replacement by a second flow path placed in such a manner that the second flow path is isolated from the supply of molten molding material. It is by the elimination of any operation providing the possibility of the molten material at high temperature and pressure coming into contact with the gas flow passages that the elimination of the serious clogging problems present in the prior art can be made. The present invention eliminates the use of small gas injection passages in favor of relatively large ones, and eliminates the use of expensive check valves. However, in forming the second injection flow path, one must be careful not only to eliminate the possibility of the molten material coming into contact with the gas passages, but also be careful to make sure there is no possibility of gas pressure traveling back through the first flow passage and back to the injection ram.

It is possible that in some applications, such as where there is a large area to fill, there is a long distance for the molding material to travel, or if an especially thick walled part is desired, that a time delay should be introduced before the injection of pressurized fluid starts to allow for additional "set up" time, and the improved method provides for this.

If no time delay is needed, the injection of the pressurized fluid or gas will be made at a first desired pressure. Again, this will depend on the application. Usually a high pressure is chosen to "break" into the fluid material. A high pressure may also be required because of small "gates" being present, or a molding material of a less viscous nature being used. Small gas channels will also require a higher pressure.

After the initial pressure is maintained for the chosen time, the pressure will be reduced to a lower "holding" pressure. This is desirable so that the mold will be "packed" without the high stress that would result if the initial high pressure was maintained. Usually about one-half second at the high pressure is all that is needed to break into the material, and the pressure will immediately be reduced to the "holding" pressure. It is conceivable that for some applications, however, the first desired pressure, and the second, or holding pressure, may be equal.

The pressure will be maintained in the mold cavity at the holding pressure until the part has cooled sufficiently to be self supporting, at which time the pressure will vented back through the second flow path.

Generally, the apparatus for carrying out the method or the process of the present invention will first involve a gas assisted injection nozzle adapted to be connected at one end to an injection molding machine, and at the other end in full communication with a mold sprue. The nozzle will have a first injection flow path for the molten molding material to pass from the injection molding machine to the mold sprue and its associated mold cavity. A means to interrupt this flow path, in the form of an interruptable or controllable passage means will be provided to displace the first injection flow path, which is in communication with the injection molding machine, and replace it with a second injection flow path in fluid communication with a source of pressurized fluid or gas. The second flow path may be coaxial with a portion of the first flow injection flow path in the nozzle, but must be such as to prevent any pressurized gas from traveling back through any portion of the first injection flow path, and displacing the ram of the injection molding machine.

Referring now to FIG. 2 showing the most preferred embodiment of the gas assisted injection molding nozzle, there is shown an injection molding nozzle generally designated by the numeral 20, having a body portion 21, having at one end a threaded portion 22 for threadably connecting the injection nozzle 20 to the output of an injection molding machine (not shown). At the other end of the body portion 21 is a nozzle adapter 23 to receive a nozzle tip 24 adapted to fit in a recess 25 to facilitate communication between the nozzle tip 24 and the associated mold sprue 26 of the mold cavity 27.

Figure 3:
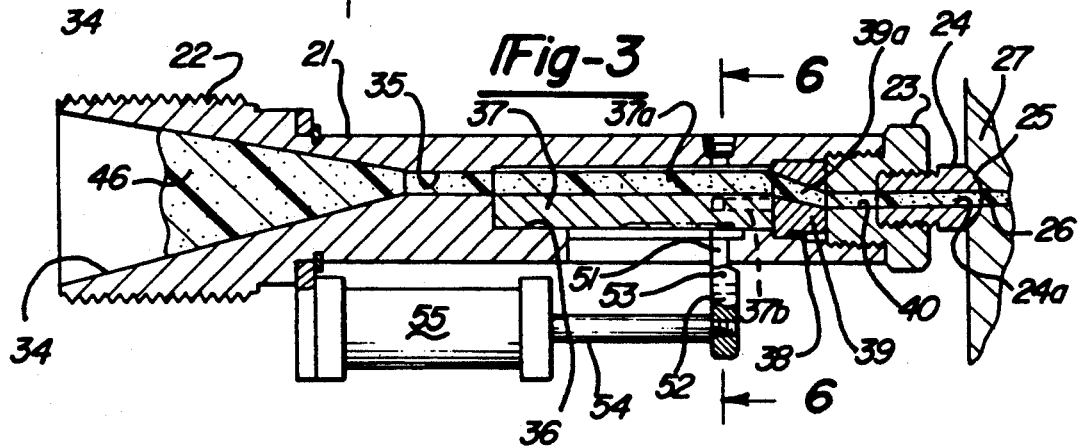
FIG. 3 is a sectional elevational view showing the controllable passage for alternately connecting a plastic supply means or a fluid pressure supply means to the injection nozzle.

Referring now to FIG. 3, it can be seen that the body portion 21 has a first bore including a converging throat portion 34, a cylindrical bore portion 35 communicating at one end with the converging throat portion, and a barrel receiving portion 36 seriatim with said first bore portion 35. A rotatable barrel 37 is mounted in the barrel receiving portion 36 and is shown in its first position wherein a first passageway 37a is axially aligned and in fluid communication with said cylindrical bore portion 35. Mounted seriatim with the rotatable barrel 37 in the diverter receiving portion 38 is a material diverter 39 in fluid communication with first passageway 37a by means of material diverter passageway 39a. Provided seriatim with the diverter receiving portion 38 of the body portion 21 is the nozzle adapter portion 40 in which is mounted the nozzle adapter 23 which has a nozzle tip 24 threadably mounted therein. The nozzle tip 24 has an associated nozzle first injection flow path is shown in FIG. 3 and is formed of 23a. A passageways 34, 35, 37a, 39a, 23a and 24a respectively.

Figure 4:
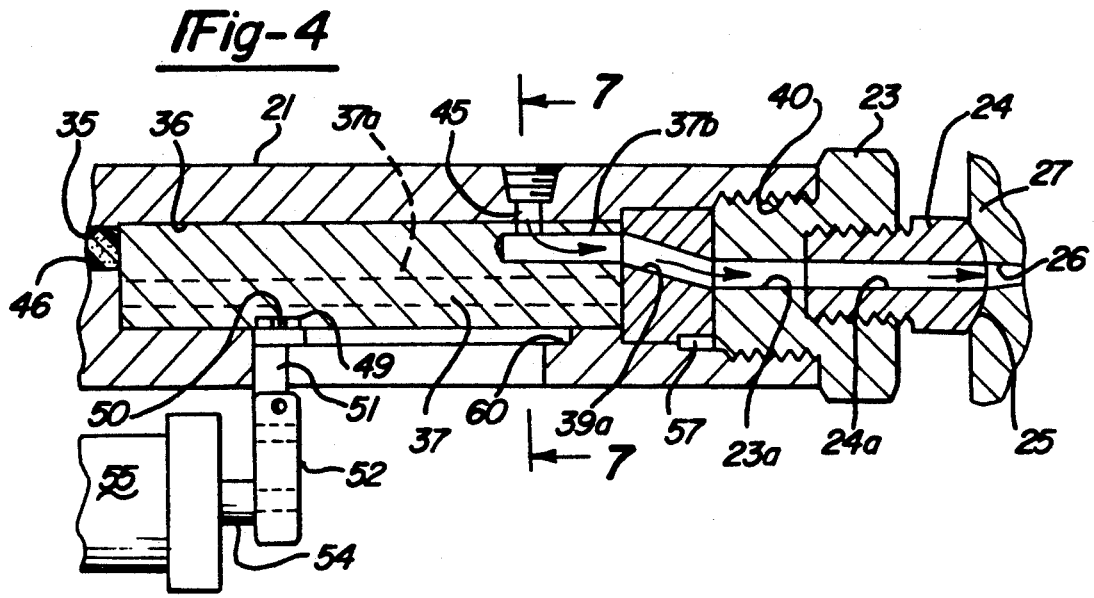
FIG. 4 is a enlarged prospective view of a portion of the construction shown in FIG. 2 showing the controllable passage in its second position forming a second flow path.

FIG. 4 shows the interruptable passage means in the form of the rotatable barrel 37 rotated to its second position, in which second passageway 37b comes into communication with second bore 45. When the rotatable barrel 37 is in its second position, a second injection flow path is formed by the passageways 45, 37b, 39a, 23a and 24a. It can be seen that since first passageway 37a and second passageway 37b, although on parallel axis, are completely separate from each other, the rotatable barrel 37 serves as a rotary valve means to completely shut off the flow of molten resin or other fluid molding material 46. It does this by displacing a portion of the first flow path and replacing it with a portion of the second flow path. Because there is no communication of the resin molding material 46 with passages 45 and 37b, the problem in the prior art of the thermo-plastic material entering and clogging the pressurized fluid supply passages during injection is eliminated.

Figure 5:
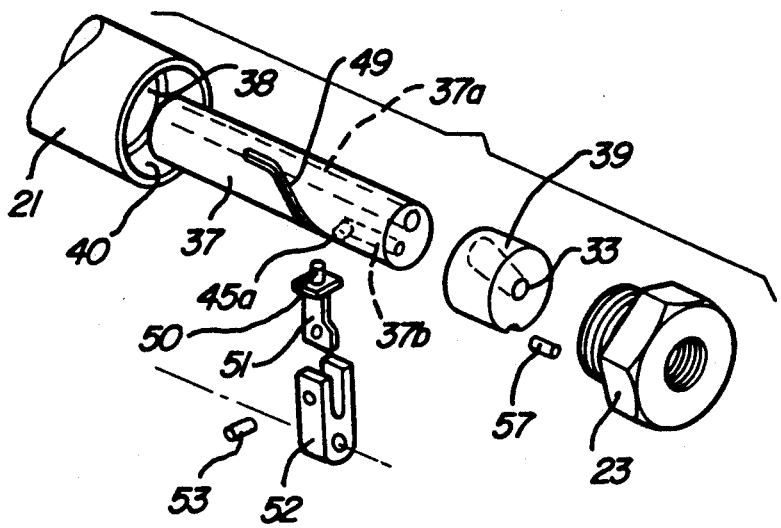
FIG. 5 is an exploded view of a portion of the construction shown in FIGS. 1-3.

Referring now to FIG. 5, there can be seen a means to operate the interruptable passage means or barrel to stop the flow of molten plastic resin and start the flow of a pressurized fluid or gas. The body portion 21 of the gas assisted injection molding nozzle 20 is shown with the material diverter receiving portion 38 and the nozzle adapter receiver portion 40. It can be seen that the rotatable barrel or interruptable passage means 37, in addition to having a first axially extending passageway and a second passageway parallel to but spaced from said first passageway (37b) has a portion of the second bore 45a formed therein which meets with the portion of the second bore 45 formed in the body portion 21 of the injection molding nozzle 20. The interruptable passage means 37 is rotated from its first position to its second position by a cam 49 formed therein which co-operates with a cam follower 50 mounted on slide cam 51 which is pinned to shaft adapter 52 by pin 53. It can be seen that the shaft adapter 52 is threadably secured to the end of the shaft 54 which is reciprocally operated by the cylinder 55. As shown in FIG. 2, when the shaft 54 is extended, the interruptable passage means or barrel 37 is in a first position to form the first flow path for the molten plastic, as previously described.

As shown in FIG. 3 when the shaft 54 is retracted the barrel 37 is rotated through a pre-determined angle to be in its second position, wherein passageway 37b now assumes the position formerly assumed by first passageway 37a. This provides communication between the second bore 45 of the throttle body portion 21 and the material diverter passage 39a of the material diverter 39 which is mounted in the material diverter receiving portion 38 of the body portion 21. Second bore 45 is in fluid communication with a pressurized gas or fluid supply means to be hereinafter described which is now supplied through the nozzle adapter 23 and the nozzle tip 24 to the mold sprue 26 associated with the mold cavity 27. To assure that the material diverter 39 remains stationary, since it must maintain the relationship with the ends of first passageway 37a and second passageway 37b, as well as with the coaxial passages 40a, 23a, and 24a respectively, it is pinned in place by second pin 57.

Figure 6:
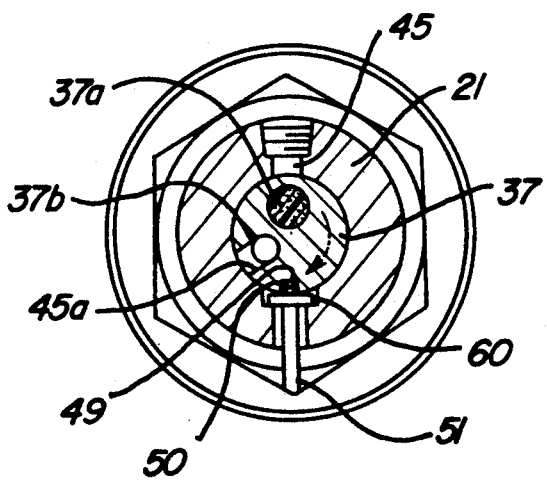
FIG. 6 is a sectional view, taken in the direction of the arrows, along the section line 6—6 of FIG. 3.
Figure 7:
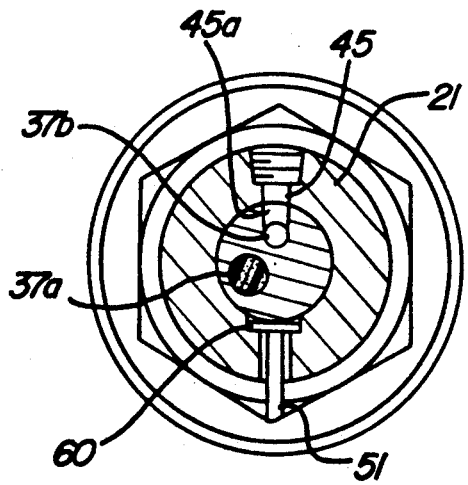
FIG. 7 is a sectional view, taken in the direction of the arrows, along the section line 7—7 of FIG. 4.

Further details of operations of the rotatable valve means or barrel 37 can be seen by reference to the sectional views shown in FIGS. 6 and 7. As can be seen, the slide cam 51 is basically T-shaped in cross section, and fits in a complimentary shaped slot 60 provided in the nozzle body 21 for linear reciprocating movement. The cam follower 50 fits in the cam 49 in the rotatable barrel 37. When the barrel 37 is in its first position shown in FIG. 6, the second passageway 37b having bore portion 45a, is out of communication with second bore 45 and thus out of communication with the pressurized gas or fluid supply.

However as seen in FIG. 7, when the rotatable barrel 37 is in its second position, first passageway 37a has been rotated counterclockwise and second passageway 37b is in communication with second bore 45 by way of passageway 45a, and is thus in communication with the source of pressurized gas or fluid.

It will be understood by those skilled in the art that there are many ways to operate the interruptable passage means or rotatable barrel 37. The cylinder 55 can be air operated or hydraulic in nature and it is not necessary to use such a cylinder to operate the cam 49 but other means, such as an electric solenoid, or a motor may be used. Also it is not necessary to use a cam and follower to rotate the rotatable barrel 37, as other means well known in the art can be used.

Figure 8:
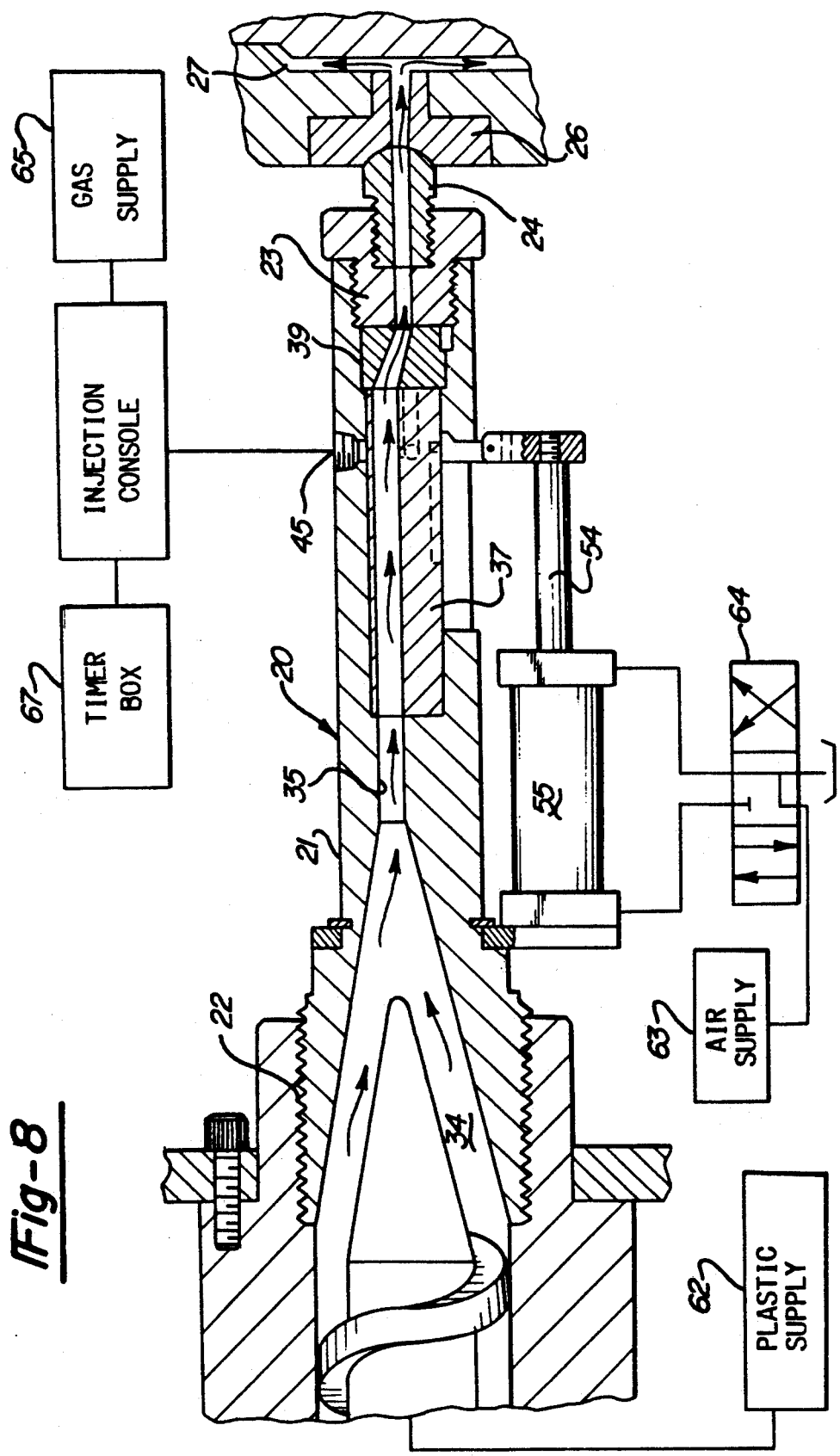
FIG. 8 is a diagrammatic view of an apparatus for gas assisted injection molding embodying the construction of the present invention.

Referring now to FIG. 8, an apparatus using my improved gas assisted injection molding nozzle can be seen. A plastic supply means generally indicated by the numeral 62 supplies a source of molding material to the nozzle 20. It can be understood by those skilled in the art that the particular means for introducing a supply of plastic material to the injection nozzle will depend on the particular material being supplied or on the particular molding application. The plastic supply means may be a common screw ram well known in the plastic molding industry.

As previously discussed, cylinder 55, if one is used to rotate the rotatable barrel 37, can be operated in many different ways. Shown by way of example is an air supply 63 connected by way of solenoid valve 64 to the cylinder 55. In a known manner the solenoid valve 64 in a first position supplies air to the proper end of the cylinder 55 to extend the piston rod 54 and rotate the barrel 37. When the solenoid valve 64 is reversed, the piston rod 54 retracts and rotates the rotatable barrel 37 back in the other direction.

As will be recognized, a means to supply a pressurized gas or fluid may also take many forms, depending on whether a gas or fluid is to be supplied, and what pressure it is to be supplied at. Many means for introducing a supply of pressurized fluid or gas can be used, and shown by way of example only is a gas supply 65 connected through an injection console 66 to second bore 45. Since various valves are contained in injection console 66, as will be hereinafter described, a timer box 67 is provided for their operation. The injection console preferably should be placed as close to the mold as possible for accuracy and ease of control of the process.

Referring now to FIGS. 8 and 9, the typical operation of the gas supply system 65 can be understood. A supply of the desired fluid, such as nitrogen, is kept in reservoir 68. The pressure of the nitrogen in the reservoir 68 is boosted by an air driven booster pump 69 of a type standard in the art. The nitrogen is supplied through regulator 70, to injection valve 71. The regulator 70 reduces the high pressure of the nitrogen in the reservoir, to the first desired pressure.

As long as injection valve 71 remains closed, the system is on standby, ready to operate. When it is desired to begin, the system operator will operate the necessary controls to begin the cycle (not shown) and timer T-1 will receive a signal when the injection ram reaches bottom. Timer T-1 will then send a signal to timer T-2. When timer T-2 receives this signal, it will cause injection valve 71 to operate. Since vent to hold valve 72, regulator relief valve 73, and exhaust to atmosphere valve 74 have not yet been operated, all the flow of the nitrogen at the first desired pressure will flow through second port 45, through the second injection path, to the mold cavity.

After timer T-2 times out, timer T-3 will open the vent to hold valve 72, and the regulator relief valve 73 will operate. Since the regulator valve 73 is set at the "holding pressure", and the vent to hold valve is vented to atmosphere, the pressure in the mold cavity will be reduced to the holding pressure, and held for a desired time.

After the above operations have taken place, timer T-2 will close the injection valve 71, and timer T-3 will close the vent to hold valve, while timer T-4 will open the exhaust to atmosphere valve, thus causing the gas or fluid in the mold cavity to travel back through the second injection flow path, back out through second bore 45, to atmosphere.

Thus, by carefully analyzing the problems present in the prior art injection molding machines and nozzles I have invented a novel construction which eliminated serious problems in the prior art. In addition a simplified construction is provided by eliminating several ball check valves.

A system is provided which eliminates the need to have a "sprue break" to vent the gas. By eliminating the mixing of the pressurized fluid and plastic streams the problem of cleaning has been eliminated, and a fast and economical method and apparatus for gas assisted injection molding has been provided.

I claim:

1. A method of fluid assisted injection molding for producing a molded article, said method including the steps of:
    a) employing an injection nozzle for injection of fluid molding material from a supply of fluid molding material and a pressurized fluid from a supply of pressurized fluid into a mold cavity, wherein said injection nozzle contains a rotatable valve containing a cylindrical barrel axially mounted within said injection nozzle, said cylindrical barrel having a separate first fluid molding material passageway and a separate second pressurized fluid passageway such that when said cylindrical barrel is in a first position said first passageway forms a portion of a first injection flow path and when said cylindrical barrel is in a second position said second passageway forms a portion of a second injection flow path, wherein said first and second injection flow paths form a common flow path from the end of the cylindrical barrel adjacent to the mold cavity to the end of the injection nozzle adjacent to the mold cavity, and wherein said first and second passageways at the end of said cylindrical barrel adjacent to the mold cavity are axially displaced from each other and from the center of the circle formed by said end of the cylindrical barrel;
    b) activating said rotatable valve to inject a quantity of fluid molding material from said supply of fluid molding material through said first injection flow path in said injection nozzle into said mold cavity, wherein said cylindrical barrel is rotated to said first position;
    c) activating the rotatable valve to stop said injection of fluid molding material through said first injection flow path by rotating said cylindrical barrel from said first position;
    d) activating the rotatable valve to inject a charge of pressurized fluid into said mold cavity through said second flow path in said injection nozzle to form a fluid containing cavity in said fluid molding material, wherein said cylindrical barrel is rotated to said second position and wherein said second flow path is isolated from said supply of fluid molding material; and
    e) containing said pressurized fluid within said mold cavity until said molded article has set in the mold cavity; and
    f) venting said pressurized fluid to ambient through said second flow path.

2. The method defined in claim 1, wherein the pressure of the charge of pressurized fluid is maintained at a pre-determined level while said fluid is being injected through the second flow path into the mold cavity.

3. The method defined in claim 1, wherein the pressurized fluid is a gas.

4. The method defined in claim 1, wherein the pressurized fluid is air.

5. The method defined in claim 1, and including the additional step of opening the mold cavity and releasing the molded article produced.

6. The method defined in claim 1, wherein said charge of pressurized fluid is injected at a first desired pressure and the charge of pressurized fluid in the mold cavity is maintained at a holding pressure which is less than the first desired pressure.

7. The method as defined in claim 1, wherein said pressurized fluid is nitrogen.

8. The method as defined in claim 1, wherein the pressurized fluid is a liquid.

9. The method defined in claim 1, wherein said venting of said pressurized fluid to ambient occurs after said molded article has set in the mold cavity and before the mold cavity is opened.

10. The method as defined in claim 1, wherein a time delay is introduced before the injection of pressurized fluid takes place.

11. A method of fluid assisted injection molding of a plastic article with a hollow cavity therein, said method including the steps of:
   a) injecting a quantity of molten plastic through an injection flow path into a mold cavity, said flow path including an injection nozzle in full communication with a mold sprue;
   b) interrupting the injection of molten plastic;
   c) injecting a charge of pressurized fluid from a pressurized fluid supply into said flow path and through said injection nozzle into the interior of said molten plastic, thereby forming the hollow cavity therein;
   d) containing said pressurized fluid within the article produced until the article with the hollow cavity therein has cooled sufficiently in the mold cavity to be self-supporting; and
   e) venting said pressurized fluid to atmosphere back through said injection nozzle.

12. The method defined in claim 11, wherein the pressure of the charge of pressurized fluid is maintained at a predetermined level while said pressurized fluid is being injected through the flow path into the mold cavity.

13. The method defined in claim 11, wherein the pressurized fluid is a gas.

14. The method defined in claim 11, wherein the pressurized fluid is air.

15. The method defined in claim 11, and including the additional step of opening the mold cavity and releasing the plastic article produced.

16. The method defined in claim 11, wherein said charge of pressurized fluid is injected at a first desired pressure and the charge of pressurized fluid in the mold cavity is maintained at a holding pressure which is less than the first desired pressure.

17. The method as defined in claim 11, wherein said pressurized fluid is nitrogen.

18. The method as defined in claim 11, wherein the pressurized fluid is a liquid.

19. The method defined in claim 11, wherein said venting of said pressurized fluid to atmosphere occurs after said article has set in the mold cavity and before the mold cavity is opened.

20. The method as defined in claim 11, wherein the pressurized fluid is a gas and wherein the pressure of the pressurized fluid in the mold cavity is effectively kept constant by having the supply of pressurized fluid be very large compared to the volume of the mold cavity.

21. A process of forming a molded article, said process including the steps of:
   a) injecting a quantity of liquid molding material through a first injection flow path in an injection molding nozzle into a mold cavity, wherein said injection molding nozzle has a rotatable valve containing a fluid molding passage forming a portion of the first injection flow path and a pressurized gas passage;
   b) rotating said rotatable valve to interrupt said injection of liquid molding material completely and replace the flow of liquid molding material into said mold cavity by an injection of pressurized fluid into the mold cavity along a second flow path in said nozzle isolated from said first flow path to form a fluid containing cavity in said liquid molding material, wherein said pressurized gas passage forms a portion of the second flow path wherein said injection molding nozzle;
   c) containing said pressurized fluid within said fluid containing cavity until said liquid molding material has set in said mold cavity; and
   d) venting said pressurized fluid through said second flow path.

22. The method defined in claim 21, wherein the pressure of the pressurized fluid is maintained at a predetermined level while said pressurized fluid is being injected through the second flow path into the mold cavity.

23. The method defined in claim 21, wherein the pressurized fluid is a gas.

24. The method defined in claim 21, wherein the pressurized fluid is air.

25. The method defined in claim 21, and including the additional step of opening the mold cavity and releasing the molded article produced.

26. The method defined in claim 21, wherein said pressurized fluid is injected at a first pressure and the pressurized fluid in the mold cavity is maintained at a second holding pressure which is less than the first pressure.

27. The method as defined in claim 21, wherein said pressurized fluid is nitrogen.

28. The method as defined in claim 21, wherein the pressurized fluid is a liquid.

29. The method defined in claim 21, wherein said venting of said pressurized fluid occurs after said molded article has set in the mold cavity and before the mold cavity is opened.

30. The method as defined in claim 21, wherein a time delay is introduced before the injection of pressurized fluid takes place.

31. A method of gas assisted injection molding for producing a molded article, said method comprising the following steps in the following sequence:
   a) introducing a molten resin through a first flow path in an injection molding nozzle into a mold cavity defining the shape of the molded article to be produced, wherein said injection molding nozzle contains a rotatable valve with a separate molten resin passage and a separate pressurized gas passage and wherein said molten resin passage forms a portion of said first flow path;
   b) rotating said rotatable valve to stop the flow of molten resin after a predetermined amount has been introduced into said mold cavity by displacing a portion of said first flow path to create a second flow path in said nozzle in communication with a source of pressurized gas, wherein said pressurized gas passage forms a portion of said second flow path;
   c) introducing pressurized gas into said molten resin;
   d) allowing said molten resin to cool and harden in said mold cavity while said pressurized gas is maintained under pressure; and
   e) releasing said pressurized gas through said second flow path.

32. The method defined in claim 31, wherein the pressure of the pressurized gas is maintained at a predetermined level while said pressurized gas is being introduced through the second flow path into the mold cavity.

33. The method defined in claim 31, wherein the charge of pressurized gas is air.

34. The method defined in claim 31, wherein said pressurized gas is introduced at a first pressure and the pressurized gas in the mold cavity is maintained at a holding pressure less than the first pressure.

35. The method as defined in claim 31, wherein said pressurized gas is nitrogen.

36. The method as defined in claim 31, wherein said releasing of said pressurized gas occurs after said molded article has set in the mold cavity and before the mold cavity is opened.

37. The method as defined in claim 31, wherein a delay time is introduced before the pressurized gas is introduced.

38. A method of producing an injection molded plastic article, said method including the steps of:
   a) introducing a stream of molten plastic material from an injection molding machine nozzle into an article forming mold cavity wherein said injection molding machine nozzle has a rotatable valve with a separate molten plastic material passage and a separate pressurized fluid passage;
   b) rotating said valve to isolate said stream of molten plastic material and substantially simultaneously to supply pressurized fluid into the interior of the molten plastic material through said separate pressurized fluid passage in said nozzle to form a fluid containing cavity therein;
   c) allowing said plastic article to cool sufficiently to be self-supporting;
   d) releasing said pressurized fluid through said pressurized fluid passage in said nozzle;
   e) opening said mold cavity and releasing said plastic article.

39. The method defined in claim 38, wherein the pressure of the pressurized fluid is maintained at a predetermined level which said pressurized fluid is being supplied into the interior of the molten plastic material.

40. The method defined in claim 38, wherein the pressurized fluid is a gas.

41. The method defined in claim 38, wherein the charge of pressurized fluid is air.

42. The method defined in claim 38, wherein the pressurized fluid is supplied at a first pressure and the pressurized fluid in the interior of the plastic material is maintained at a holding pressure less than the first pressure.

43. The method as defined in claim 38, wherein said pressurized fluid is nitrogen.

44. The method as defined in claim 38, wherein the pressurized fluid is a liquid.

45. The method as defined in claim 38, wherein said releasing of said pressurized fluid occurs after said article is self-supporting and before the mold cavity is opened.

46. The method as defined in claim 38, wherein a delay time is introduced before said pressurized fluid is supplied.

* * * * *